United States Patent Office 2,712,443
Patented July 5, 1955

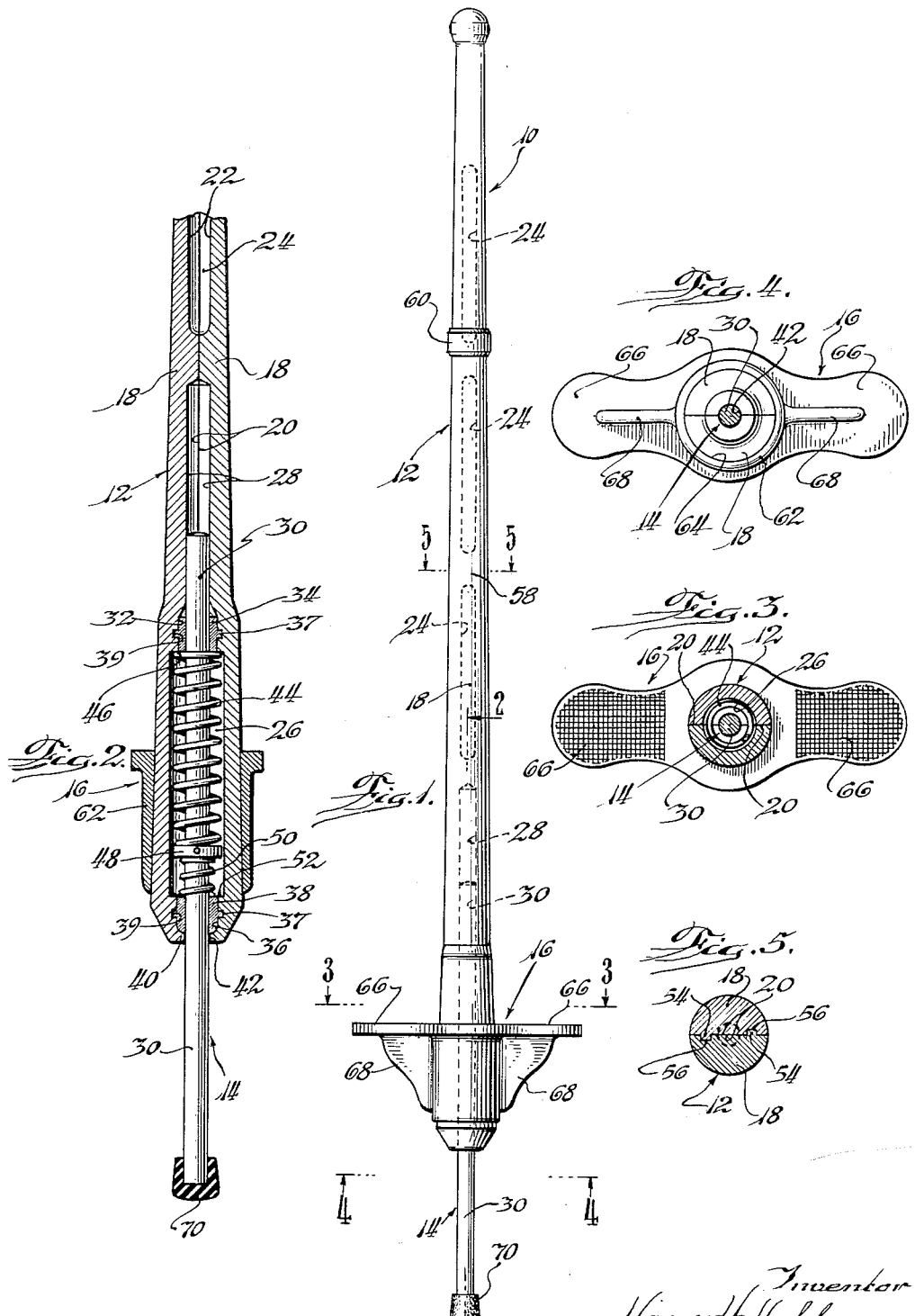

2,712,443
POGO STICK

Harry H. Hohberger, Chicago, Ill.

Application September 6, 1952, Serial No. 308,262

4 Claims. (Cl. 272—57)

The present invention relates to improvements in pogo sticks and is primarily concerned with a new and improved pogo stick having constructional features tending to make its manufacture simple and low cost.

It is, therefore, the principal object of the present invention to provide a new and improved pogo stick having parts of the body or upright member so constructed and arranged as to be simple to fabricate and to assemble.

Another object is to provide a new and improved pogo stick which is extremely sturdy in its construction and which, therefore, will give its users many more hours of pleasure than those heretofore made and sold.

Another object is to provide a new and improved pogo stick having the upright or body member made from a pair of identical parts having complementary mating faces secured together. In furtherance of this objective it is contemplated that the body member should be made of a moldable material such as a thermosetting or a thermoplastic synthetic resin and that the two parts of the body member might then be made in the same mold or mold cavity.

A further object is to provide a new and improved pogo stick in which the biasing spring is completely enclosed, protecting it from dirt and protecting the user against accidents.

Other objects and advantages will become apparent from the following description taken in conjunction with the accompanying drawing wherein:

Fig. 1 is an elevational view of the new and improved pogo stick of the present invention;

Fig. 2 is an enlarged medial longitudinal sectional view and may be considered as being taken substantially along the line 2—2 of Fig. 1 looking in the direction of the arrows;

Fig. 3 is an enlarged horizontal cross-sectional view taken along the line 3—3 of Fig. 1 looking in the direction of the arrows;

Fig. 4 is a bottom enlarged cross-sectional view taken along the line 4—4 of Fig. 1 looking in the direction of the arrows; and Fig. 5 is an enlarged detail cross sectional view taken along the line 5—5 of Fig. 1 looking in the direction of the arrows and showing how the two body members' halves are joined together.

The pogo stick, indicated generally by the reference character 10, comprises an upright body member 12, a plunger portion 14 which is adapted to reciprocate relative to the body member, and a foot rest or step 16 adjacent the bottom of the body member 12 and upon which the user stands when exercising with the pogo stick in the well known manner.

The body member 12 comprises a pair of identical pieces 18 having complementary mating faces 20. It is preferred that the body member halves 18 may be of a moldable plastic material; and the following plastics have been found to be acceptable: acrylic resins such as methyl methacrylate; cellulose acetate butyrate; cellulose acetate; polyester resins; filled melamine resins; and phenolic resins such as phenol-formaldehyde resins. The plastic material should be selected on the basis of its hardness and toughness and it, of course, should not be a brittle plastic.

The body member portions 18 are each molded with complementary cavities 22 therein so that when jointed together a plurality of weight reducing openings 24 are formed in the body member 12. At the lower ends the portions 18 are molded to provide the two halves of a spring housing 26, the axis of which is on the axis of the body member 12. At its upper end the spring housing 26 communicates with a guide bore 28 which receives and guides the upper end of a plunger rod 30. The juncture between the spring housing 26 and the guide bore 28 is formed with a counterbore 32 to receive a guide bearing 34. The lower end of the spring housing 26 is similarly formed with a counterbore 36 to receive a bearing 38. Preferably the bearings 34 and 38 are sleeve bearings of the oil or lubricant impregnated type. The bearing 38 is retained in the counterbore 36 by a shoulder 40 which defines opening 42 through which the plunger rod 30 projects. The bearings 34 and 38 are provided with circumferential fins or flanges 37 which seat in annular grooves 39 to restrain the bearings against longitudinal movement.

A main biasing spring 44 is retained in the spring housing 26 between a shoulder 46 provided by the counterbore 32 and the end of the bearing 34 and a retaining member washer 48 which may be staked or otherwise secured to the plunger rod 30. A smaller lighter spring 50 is retained between the underside of the retaining washer 48 and a shoulder 52 provided by the counterbore 36 and the inner end of the sleeve bearing 38. The spring 50 is a shock absorbing spring and cushions the action of the substantially stronger spring 44 as it projects the plunger 30 outwardly upon release of the load.

In orer that the cavities forming the counterbores 32 and 36, spring housing 26 and guide bore 28 be properly mated, the body portion halves 18 are provided with a number of short longitudinally extending complementary tongues 54 and grooves 56, as seen in Fig. 5. It is preferred that these tongues and grooves be formed at the web portions 58 which define the upper and lower limits of the weight reducing openings 24 and the upper end of the guide bore 28. There thus would be at least four of these pairs of tongue and groove arrangements in the particular embodiment of the invention illustrated in the drawing. The interlocked tongues 54 and grooves 56 prevent any longitudinal or transverse movement of the portions 18 relative to each other.

It will be observed from Figs. 1 and 2 that the outer surface of the body member 12 tapers and is substantially thicker at its lower end than at its upper end. In addition to enhancing the appearance of the pogo stick 10 this taper provides a function which is utilized in adding strength to the device. When the device is assembled and the two body portion halves 18 are brought together and preferably secured by means of a cement or a solvent which softens and reacts with the plastic material of the body members in order to bond them into a unit, a retaining ring 60 is slipped over the upper end and is pushed down on the joined body members 18 until it can be moved no further. Thus the wedging action of the ring 60 with the tapering outer surface of the body member 18 insures that these portions will be held together.

This taper is also utilized in securing the foot rest 16 in position. The foot rest 16 preferably is a lightweight casting and comprises a sleeve 62, the bore 64 of which has a taper complementary to the taper of the lower end of the body member 12. A pair of diametrically opposite foot rests or steps 66 project sidewardly of the sleeve portion 62 at the upper edge thereof and are additionally joined to the sleeve by reinforcing webs 68 on their undersides. It is clear that when the device is assembled the sleeve 62 is wedged against the tapered body portion to hold these parts together in the same manner as the retaining ring 60.

The lower end of the plunger rod 30 is fitted with a rubber or like material tip 70 to prevent damage to the rod and also to minimize the amount of noise the pogo stick makes when used.

In manufacture, the body portion halves 18 might be formed in the same mold cavity or in a mold having a number of cavities so that these halves are identical and and have the complementary mating faces 20. The springs 44 and 50 are slipped onto the rod 30 on opposite sides of the retaining washer or shoulder 48 and then the bearings 34 and 38 are slipped onto the rod at the outer ends of the springs. This assembly is compressed until the bearings 34 and 38 can be inserted into the open portions of the counterbores 32 and 36, respectively, in one of the halves 18. The other half 18 is then placed over the assembly of the first half and rod, springs and bearings, thus enclosing the springs and the bearings. As noted above, the body halves 18 are preferably cemented or otherwise permanently secured together. The assembly of the pogo stick is completed by sliding the foot rest 16 and the retaining sleeve 60 over the body portion 12 from the upper end, as seen in Fig. 1, wedging these parts down until they may not be moved farther downwardly. It should be noted, of course, that as the pogo stick is used the downward force on the foot rest 16 is resisted by the complementary tapers of the body portion and the sleeve bore 64 which increases the wedging action. It is clear, therefore, that the assembly of this pogo stick is relatively simple and that its manufacture is, therefore, of very low cost.

Another feature of the pogo stick is embodied in the completely enclosed springs 44 and 50 which cannot catch the clothing or fingers or feet of the child using the pogo stick.

While a preferred embodiment of the pogo stick constituting this invention has been shown and described, it will be apparent that numerous modifications and variations thereof may be made without departing from the underlying principles of the invention. It is, therefore, desired by the following claims to include within the scope of the invention all such variations and modifications by which substantially the results of this invention may be obtained through the use of substantially the same or equivalent means.

What is claimed as new and desired to be secured by United States Letters Patent is:

1. A pogo stick comprising a body member composed of a pair of identical halves joined together along complementary mating faces, said mating faces being formed with interlocking tongues and grooves to prevent longitudinal movement between said halves, said body member having a generally tapering outer surface so as to be larger at its lower end than at its upper end, said body member being formed with an axial spring housing in its lower end and having an aperture in its lower end opening into said housing, a plunger slidably projecting through said aperture and into said housing, cooperating means on said plunger and in said housing limiting the outward movement of said plunger, a spring confined within said housing and biasing said plunger outwardly, and a foot rest having a sleeve portion formed with an internal taper complementary to the taper of said body member encircling said body member adjacent its lower end to clamp said body halves together and to locate said foot rest on said body member.

2. A pogo stick comprising a body member having a generally tapering outer surface so as to be larger at its lower end than at its upper end, said body member having an axial cavity at its lower end and having an aperture in its lower end opening into said cavity, said aperture having an area smaller than the cross-sectional area of said cavity to provide a shoulder within said cavity and around said aperture, a rod slidably projecting through said aperture and into said cavity, said rod having a circumferential flange thereon of an area greater than that of said aperture to limit the outward movement of said rod, a first spring confined within said cavity and bearing against said flange to bias said rod outwardly, and a second spring in said cavity confined between said shoulder and said flange and arranged in opposition to said first spring to cushion the end of the outward movement of said rod.

3. A pogo stick comprising a body member composed of a pair of identical halves joined together along complementary mating faces, said mating faces being formed with interlocking tongues and grooves to prevent longitudinal movement between said halves, said body member having a generally tapering outer surface so as to be larger at its lower end than at its upper end, said body member being formed with an axial spring housing in its lower end and having an aperture in its lower end opening into said housing, said aperture having an area smaller than the cross-sectional area of said spring housing to provide a first shoulder within said cavity and around said aperture, an axial guide bore in said body member opening into said housing opposite said aperture and forming a second shoulder within said housing around said last-named opening, a rod slidably projecting through said aperture and said housing and into said guide bore, said rod having a circumferential flange thereon of an area greater than that of said aperture to limit the outward movement of said rod, a spring confined between said flange and said second shoulder within said housing and biasing said rod outwardly, and a foot rest having a sleeve portion formed with an internal taper complementary to the taper of said body member at its lower end to clamp said body halves together and to mount said foot rest on said body member.

4. A pogo stick comprising a body member composed of a pair of identical halves joined together along complementary mating faces, said mating faces being formed with interlocking tongues and grooves to prevent longitudinal movement between said halves, said body member having a generally tapering outer surface so as to be larger at its lower end than at its upper end, said body member having an axial spring housing in its lower end and having an aperture in its lower end opening into said housing, said aperture having an area smaller than the cross-sectional area of said spring housing to provide a first shoulder within said cavity and around said aperture, an axial guide bore in said body member opening into said housing opposite said aperture and forming a second shoulder within said housing around said last named opening, a rod slidably projecting through said aperture and said housing and into said guide bore, bearing means supporting said rod for sliding movement located at opposite ends of said housing, said rod having a circumferential flange thereon of an area greater than that of said aperture to limit the outward movement of said rod, a spring confined between said flange and said second shoulder within said housing and biasing said rod outwardly, and means including a foot rest having an internally tapered sleeve portion encircling said body member adjacent its lower end to clamp said body member halves together.

References Cited in the file of this patent

UNITED STATES PATENTS

| | | |
|---|---|---|
| 2,499,483 | Foy | Mar. 7, 1950 |

FOREIGN PATENTS

| | | |
|---|---|---|
| 182,882 | Great Britain | July 6, 1922 |